F. B. HULL.
PLOWING DEVICE.
APPLICATION FILED SEPT. 25, 1915.
1,191,185.
Patented July 18, 1916.
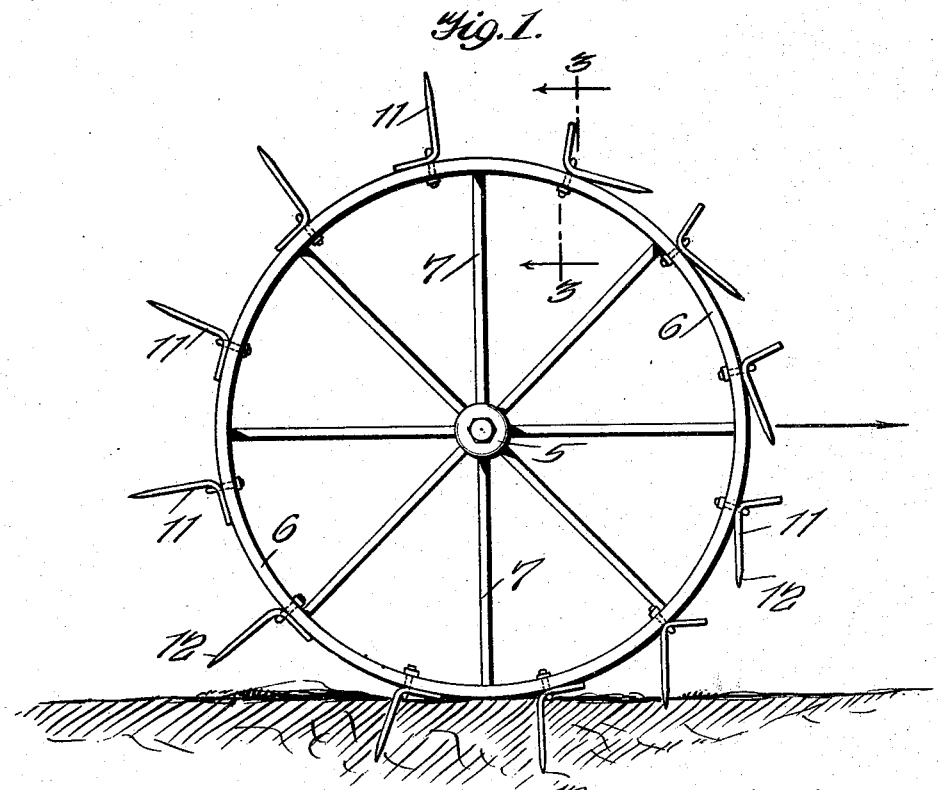
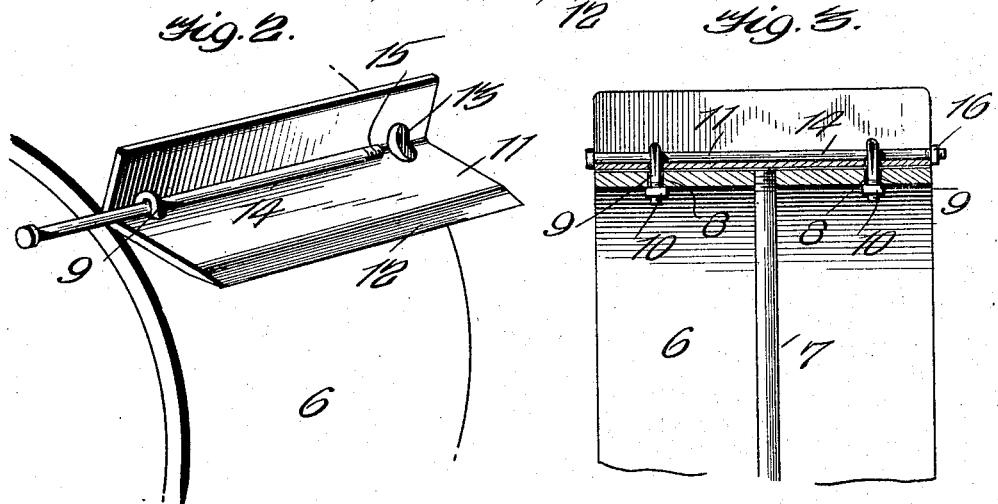
WITNESSES:
E. H. Callaghan
W. E. Beck
INVENTOR
FREDERICK B. HULL,
BY Munn & Co.
ATTORNEYS

UNITED STATES PATENT OFFICE.

FREDERICK BARTLEY HULL, OF LYONS, KANSAS.

PLOWING DEVICE.

1,191,185. Specification of Letters Patent. Patented July 18, 1916.

Application filed September 25, 1915. Serial No. 52,666.

*To all whom it may concern:*

Be it known that I, FREDERICK B. HULL, a citizen of the United States, and a resident of Lyons, in the county of Rice and State of Kansas, have invented an Improvement in Plowing Devices, of which the following is a specification.

This invention is an improvement in agricultural machines and has particular reference to a rotary plowing device.

An object of the invention is the provision of an apparatus designed to dispense with the use of the ordinary mold board plows and, at the same time, perform all the functions thereof, said apparatus including a plurality of blades pivotally connected to a rotary element, such as a traction engine wheel, in such a manner that said blades will enter the ground in a substantially vertical position and effectively loosen the soil as the forward movement of the blade supporting element progresses.

Another object is the provision of a device of this character which is simple in construction, easy to manufacture, durable, and effective in carrying out the purpose for which it is designed.

The inventive idea involved is capable of receiving a variety of mechanical expressions, one of which, for the purpose of illustrating the invention, is shown in the accompanying drawing, in which—

Figure 1 is a side elevation of the device constructed in accordance with the invention. Fig. 2 is an enlarged fragmentary perspective view thereof showing the position of one of the blades when applied to the rotary element. Fig. 3 is a transverse section on the line 3—3 of Fig. 1.

Referring more particularly to the accompanying drawing in which like reference characters indicate similar parts the numeral 5 indicates a rotary element used in connection with the invention which is preferably a traction engine wheel although it is to be understood that any other construction may be employed suitable for the purpose. This rotary element includes the usual construction of flat rim 6 medially of the edges of which are secured a plurality of spokes 7. At certain intervals the rim is provided on each side of the spokes with oppositely disposed openings 8 adapted to receive therein the shanks of suitable eye-bolts 9 which are secured in position by means of nuts 10, the openings in said bolts being in direct transverse alinement for a purpose which will appear in the course of the description.

The means for plowing and loosening the earth comprises a plurality of cutting blades generally indicated by 11 and of a substantially L-shaped formation, the long arm of said blades being sharpened as indicated at 12 so as to readily enable the same to enter the soil. At the bent portion of each of the blades 11 the same is provided with openings 13 of sufficient size to receive therethrough the portions of the bolts 9. In order to detachably secure said blades in position on the rim 6 there is provided a locking pin 14 which is adapted to extend through the eye-bolts 9 whereby the blades 11 are pivotally connected to the rotary element. When in position these blades extend transversely of the rim and direction of travel of the rotary element 5 which is preferably of substantially the same width as said blade. One end of the locking pin or rod 14 is preferably screw threaded as indicated at 15 in order to thread thereon a nut 16 whereby said pin is securely retained in position. It will, therefore, be seen that if it is desired to remove one of the blades in order to replace the same with a new one it is only necessary to loosen the nut 16 from the pin and withdraw the latter from engagement with the eye-bolts.

This device may be employed for many purposes such as surface cultivation, destroying weeds, and preparing the seed bed for small grain, and in operation, when the apparatus is traveling in the direction of the arrow shown in Fig. 1, the cutting arms of the blades 11 will assume a substantially vertical position as shown in Fig. 1 when the same approach the ground. As the device progresses said blades will loosen and plow up the soil and after leaving the same will assume the position shown at the left of Fig. 1, when the short arm of each blade will abut the rim 6 and form a brace for said blade until the same reaches its uppermost position during the revolution of the element 5. After said blade has passed the vertical position the same will swing about its pivot and should any of the soil adhere thereto it will be jarred therefrom when the blade assumes the position shown at the right of Fig. 1.

What is claimed is:—

1. A plowing device comprising a rotary element including a rim having openings therein, eye-bolts mounted in said openings, a plurality of substantially L-shaped cutting blades having openings in their bent portions receiving said eye-bolts, and a locking pin extending through the apertures in said eye-bolts and pivotally connecting said blades to said rim.

2. A plowing device comprising a rotary element including a rim having openings therein, eye-bolts mounted in said openings, a plurality of substantially L-shaped cutting blades having openings in their bent portions receiving said eye-bolts, and means engaging said eye-bolts for pivotally connecting said cutting blades to said rim.

3. A plowing device comprising a rotary element including a rim having openings therein, eye-bolts mounted in said openings, cutting blades adapted to enter the ground in a vertical position, and means engaging said eye-bolts for pivotally connecting said plates to said rim.

FREDERICK BARTLEY HULL.

Witnesses:
G. F. McCLELLAND,
Mrs. R. W. POLK.

Copies of this patent may be obtained for five cents each, by addressing the "Commissioner of Patents, Washington, D. C."